United States Patent
Jeansonne et al.

(10) Patent No.: US 7,644,222 B2
(45) Date of Patent: Jan. 5, 2010

(54) LOW LATENCY EVENT COMMUNICATION SYSTEM AND METHOD

(75) Inventors: Jeffrey Kevin Jeansonne, Houston, TX (US); Dallas M. Barlow, Tomball, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 265 days.

(21) Appl. No.: 11/586,164

(22) Filed: Oct. 25, 2006

(65) Prior Publication Data

US 2008/0104303 A1 May 1, 2008

(51) Int. Cl.
*G06F 13/36* (2006.01)
*G06F 13/24* (2006.01)
*G06F 9/00* (2006.01)

(52) U.S. Cl. .................. 710/315; 710/260; 360/75; 713/1

(58) Field of Classification Search ............ None
See application file for complete search history.

(56) References Cited

U.S. PATENT DOCUMENTS

| | | | |
|---|---|---|---|
| 5,227,929 A | 7/1993 | Comerford | |
| 7,328,279 B2* | 2/2008 | Oshins et al. | 709/238 |
| 2004/0243534 A1* | 12/2004 | Culter et al. | 707/1 |
| 2005/0187719 A1* | 8/2005 | Oshins et al. | 702/19 |
| 2006/0150731 A1* | 7/2006 | Fontanella et al. | 73/488 |
| 2006/0152842 A1* | 7/2006 | Pasolini et al. | 360/75 |

OTHER PUBLICATIONS

Advanced Configuration and Power Interface Specification, Revision 3.0. Sep. 2, 2004; 618 pages.*

* cited by examiner

*Primary Examiner*—Mark Rinehart
*Assistant Examiner*—Brian T Misiura

(57) ABSTRACT

A low latency event communication system comprises a computer system having an Advanced Configuration and Power Interface (ACPI) namespace table with a Peripheral Component Interconnect (PCI) branch and a non-PCI device described in the PCI branch to enable the non-PCI device to be assigned a PCI resource.

20 Claims, 2 Drawing Sheets

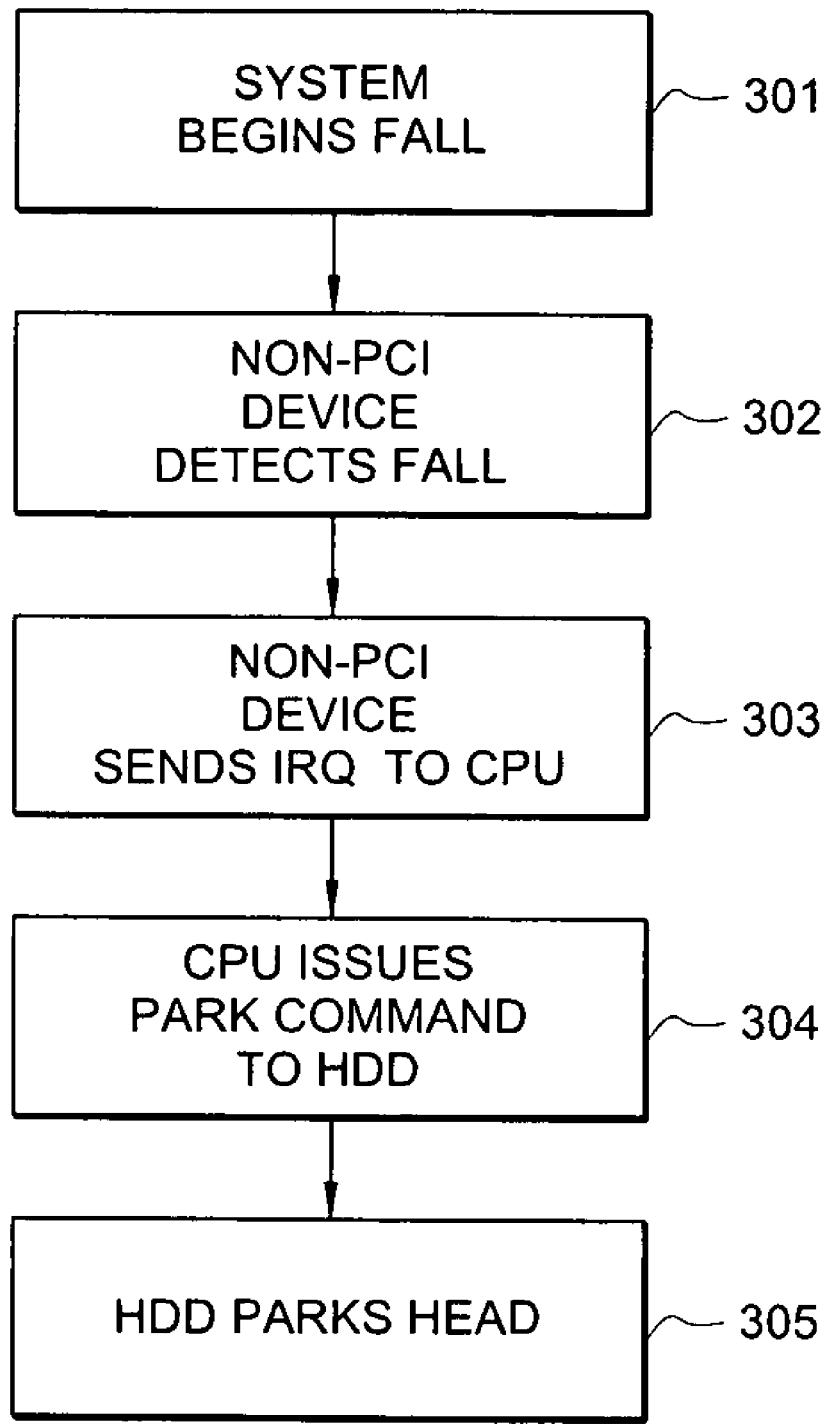

LOW LATENCY EVENT COMMUNICATION SYSTEM AND METHOD

BACKGROUND

When a computer system is subjected to a shock force, such as striking the floor after a fall from a desktop, a hard disk drive (HDD) of the computer system is less likely to be damaged if the head is parked. An accelerometer, either a two-dimensional (2D) or three-dimensional (3D) version, may be used for identifying the start of a freefall. However, in order to maximize the chances that the HDD head is parked before the computer strikes the floor, the freefall event should be communicated with minimal delay.

Computer systems use devices which may comply with a number of different industry standard specifications such as Peripheral Component Interconnect (PCI) and/or PCI Express, which are the current favored standards for plug-in cards, and Industry Standard Architecture (ISA), which is an older generation standard for plug-in cards. Interrupt requests (IRQs) are often used by PCI-compliant devices for low latency event communication by directly signaling a central processing unit (CPU) of the computing system. Unfortunately, some cost-effective accelerometers that could be used to detect a freefall are non-PCI devices (i.e., a device which does not conform to the industry standard PCI specification). One example of such a non-PCI accelerometer is an inter-integrated circuit (I2C) bus device. Unfortunately, I2C bus devices lack the ability to use an IRQ and, therefore, do not have the same native capability for low latency event communication as do PCI devices. Accordingly, latency associated with typical I2C bus messaging methods result in an increased likelihood of damage to the HDD if a freefall event is detected if a non-PCI device is used to detect the freefall event.

BRIEF DESCRIPTION OF THE DRAWINGS

For a more complete understanding of the present invention, the objects and advantages thereof, reference is now made to the following descriptions taken in conjunction with the accompanying drawings, in which:

FIG. 3 is a flow diagram illustrating another embodiment of a low latency event communication method.

DETAILED DESCRIPTION OF THE DRAWINGS

Figure 1:
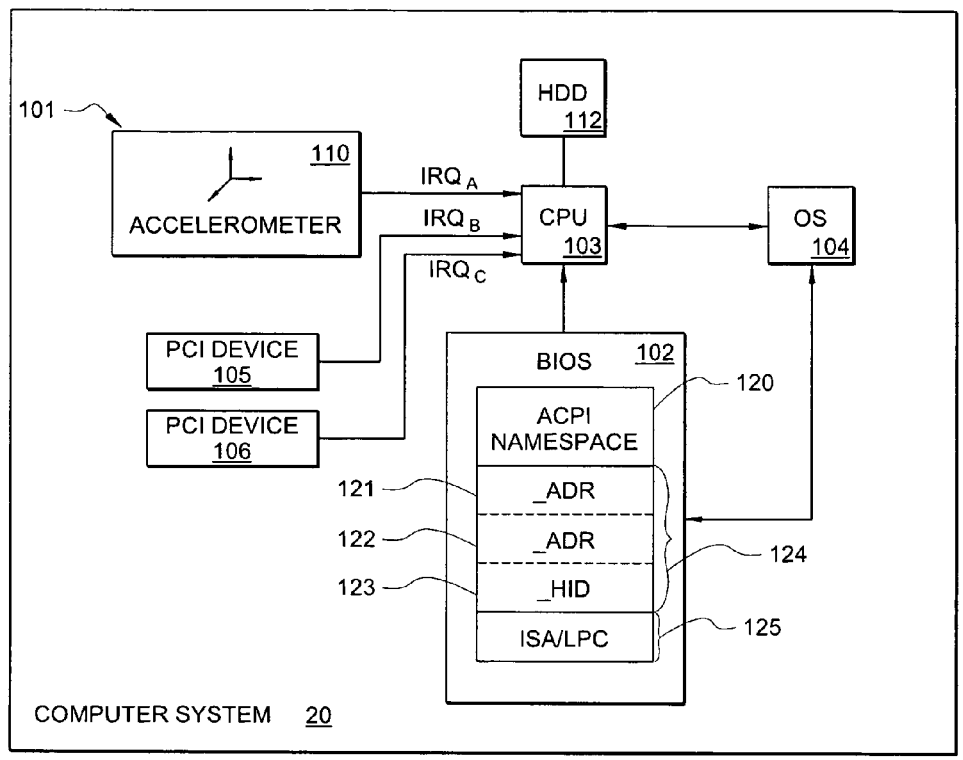
FIG. 1 is a block diagram illustrating an embodiment of a low latency event communication system.
Figure 2:
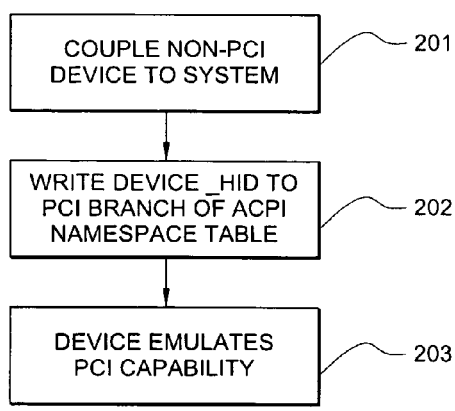
FIG. 2 is a flow diagram illustrating an embodiment of a low latency event communication method.

The preferred embodiments of the present invention and the advantages thereof are best understood by referring to FIGS. 1-3 of the drawings, like numerals being used for like and corresponding parts of the various drawings.

FIG. 1 is a block diagram illustrating an embodiment of a low latency event communication system 10. In FIG. 1, system 10 is implemented in a computer system 20 such as, but not limited to, a laptop or notebook computer system, a tablet computer system, a desktop computer system, and a handheld gaming device. In FIG. 1, system 10 comprises a non-Peripheral Component Interconnect (PCI) device 101, a basic input/output system (BIOS) 102, a central processing unit (CPU) 103, an operating system (OS) 104, two PCI devices 105 and 106 and a hard disk drive (HDD) 112. In the embodiment illustrated in FIG. 1, non-PCI device 101 comprises an inter-integrated circuit (I2C) bus accelerometer 110. However, it should be understood that non-PCI device 101 may comprise other types of non-PCI devices. PCI devices 105 and 106 may comprise any type of PCI device such as, but not limited to, graphical display cards or communication devices, such as Ethernet cards.

In the embodiment illustrated in FIG. 1, BIOS 102 comprises an Advanced Configuration and Power Interface (ACPI) namespace table 120 which is shown with a PCI branch 124 and an Industry Standard Architecture low pin count (ISA/LPC) branch 125. For example, when system 10 is initialized, such as during power-on or a reboot, OS 104 reads ACPI namespace table 120 to determine what devices are connected to and/or are otherwise present on system 10. ACPI namespace table 120 is organized hierarchically, with branches for different types of devices. For example, OS 104 assigns resources to devices based on which resources are requested by a namespace table entry for the device, and also based on the branch in which the namespace table entry is located. Generally, OS 104 reserves a set of resources or capabilities for PCI devices, and only properly assigns and handles those resources for devices in PCI branch 124 of ACPI namespace table 120. An interrupt request (IRQ) is assigned to the particular PCI device when OS 104 notes an entry corresponding to the particular PCI device in ACPI namespace table 120. The particular PCI device then uses the assigned IRQ to communicate an event. In FIG. 1, PCI branch 124 of ACPI namespace table 120 comprises address objects (_ADRs) 121 and 122 for PCI devices 105 and 106, respectively. PCI devices 105 and 106 have _ADRs 121 and 122, and use $IRQ_B$ and $IRQ_C$, respectively, to communicate with CPU 103.

Because non-PCI devices do not conform to the PCI industry standards, non-PCI devices do not have an _ADR. Thus, without an _ADR (which is required for entry in the PCI branch of an ACPI namespace table), non-PCI devices would be placed in an ACPI namespace table outside of the PCI branch, such as in the ISA/LPC branch. However, such a placement scheme prevents a non-PCI device from being assigned a reserved PCI resource by an OS, such as an IRQ above fifteen (which some operating systems will not properly assign and handle for devices in the ISA/LPC branch of a namespace table). According to embodiments of system 10, a hardware identification object (_HID) 123 to describe non-PCI device 101 is used in place of an _ADR for an entry in PCI branch 124 of ACPI namespace table 120. In operation, OS 104 accepts _HID 123 in place of an _ADR, and assigns requested PCI resources, including an IRQ, to non-PCI device 101 because OS 104 interprets a table entry in the PCI branch 124 as corresponding to a PCI device and, therefore, properly assigns and handles PCI resources for that device. Thus, as illustrated in FIG. 1, _HID 123 is associated with and/or otherwise used to describe non-PCI device 101 such that OS 104 assigns a PCI resource, such as $IRQ_A$, to non-PCI device 101. Thus, by placing an entry, _HID 123, for non-PCI device 101 in the PCI branch 124 of ACPI namespace table 120 rather than the ISA/LPC branch 125, non-PCI device 101 may be assigned PCI resources, including an IRQ above fifteen. The PCI capabilities that may be emulated for non-PCI device 101 also include direct memory access (DMA), memory address assignment and input/output (I/O) capability.

As described above, an IRQ, also known as a hardware interrupt, is a way to get the attention of a CPU. DMA enables a device to access system memory directly, bypassing the CPU, which improves the speed the communication by the device. PCI devices may also be assigned a section of system memory for exclusive use by the device, as well as ports to be used for I/O. Other devices, in addition to a non-PCI accelerometer, such as general ISA or I2C bus devices, may also emulate PCI capabilities by using an _HID in the PCI branch of an ACPI namespace table such as, but not limited to, a system board device, a notebook computer lid switch and a power supply connection indicator. Thus, embodiments of system 10 may be used in a variety of applications. Accordingly, embodiments of system 10 enable an entire class of devices access to resources that were previously denied or mishandled by an OS in order to emulate capabilities of another class of devices. For example, system 10 may be used in connection with an accelerometer, lid switch, power supply connection indicator, or other I2C or ISA device to emulate PCI capabilities, such as CPU interrupts, DMA, memory reservation, and PCI port assignment.

FIG. 2 is a diagram illustrating an embodiment of a low latency communication method. The method begins at block 201, where non-PCI device 101 is coupled to system 10. In block 202, _HID 123 for non-PCI device 101 is written to PCI branch 124 of ACPI namespace table 120 in computer BIOS 102. In some embodiments, the _HID 123 entry in ACPI namespace table 120 used to describe non-PCI device 101 enables use of a PCI resource, such as an IRQ. Thus, in block 203, non-PCI device 101 emulates PCI capability, such as the ability to interrupt the CPU, using an IRQ. Thus, embodiments of system 10 enable low latency event communication capability for non-PCI accelerometer 110, such as in a laptop computer, so that a head of HDD 112 may be parked between the time that a freefall is detected and the laptop computer strikes the floor.

FIG. 3 is a flow diagram illustrating an embodiment of a low latency event communication method. The method begins at block 301, where computer system 20 begins a freefall event, such as falling from a table or desktop. At block 302, non-PCI device 101 (e.g., a non-PCI accelerometer 110) detects the fall and, at block 303, transmits an IRQ to CPU 103. At block 304, CPU 103 responds to the IRQ by issuing a park command to HDD 112. At block 305, HDD 112 parks the head of HDD 112. The time delay between the start of a freefall event and impact of computer system 20 may be less than a second for a fall from a typical desktop, but the process of blocks 302, 303, 304 and 305 requires some amount of time. Embodiments of system 10 enable use of non-PCI device 101 and an IRQ to interrupt CPU 103 to provide a greater likelihood that the head of HDD 112 will be parked before impact of computer system 20.

What is claimed is:

1. A low latency event communication method, comprising:
    storing an entry, in a Peripheral Component Interconnect (PCI) branch of an Advanced Configuration and Power Interface (ACPI) namespace table of a computer system, that defines a non-PCI device; and
    assigning a PCI interrupt used for PCI devices to the non-PCI device defined in the ACPI namespace table.

2. The method of claim 1, wherein the storing includes defining the non-PCI device as an inter-integrated circuit (I2C) bus device.

3. The method of claim 1, wherein the non-PCI device is a non-PCI accelerometer and where the non-PCI accelerometer emulates a PCI device by gnerating the assigned PCI interrupt.

4. The method of claim 1, further comprising defining the non-PCI device in the entry using a hardware identification object (_HID).

5. The method of claim 1, further comprising generating the PCI interrupt in response to an event from the non-PCI device.

6. The method of claim 1, further comprising transmitting an IRQ as the PCI interrupt from the non-PCI device to a central processing unit (CPU).

7. The method of claim 1, further comprising accepting, by an operating system (OS), an $_{13}$ HID associated with the non-PCI device for assigning a PCI capability to the non-PCI device.

8. The method of claim 1, further comprising
    detecting, by the non-PCI device, a freefall event associated with the computer system;
    generating the PCI interrupt assigned to the non-PCI device in response to the free fall event; and
    parking a head of a disk drive in response to the PCI interrupt.

9. The method of claim 1, further comprising storing the entry of the non-PCI device in an ACPI namespace table of a basic input/output system (BIOS).

10. The method of claim 1, further comprising transmitting an IRO by the non-PCI device to cause parking of an HDD.

11. A low latency event communication system, comprising:
    a computer system having an Advanced Configuration and Power Interface (ACPI) namespace table with a Peripheral Component Interconnect (PCI) branch; and
    a non-PCI device having an entry stored in the PCI branch and where the computer system assigns to the non-PCI device a PCI resource.

12. The system of claim 11, wherein the PCI resource comprises an interrupt request (IRO) used for PCI devices.

13. The system of claim 11, wherein the non-PCI device comprises a non-PCI accelerometer.

14. The system of claim 11, the non-PCI device is defined in the ACPI namespace table using a hardware identification object ($_{13}$ HID).

15. The system of claim 11, where the computer system includes a disk drive;
    wherein the non-PCI device comprises an accelerometer that can detect a freefall event of the computer system; and
    in response to the detected freefall event, the non-PCI device generates a PCI interrupt that causes a head of the disk drive to park.

16. A low latency event communication method, comprising:
    assigning a Peripheral Component Interconnect (PCI) interrupt to a non-PCI device;
    generating the PCI interrupt in response to an event from the non-PCI device; and
    transmitting the PCI interrupt to a processing unit.

17. The method of claim 16, further comprising storing a hardware identification object ($_{13}$ HID) associated with the non-PCI device in a table where an operating system identifies the non-PCI device as a PCI device.

18. The method of claim 16, further comprising transmitting an IRQ as the PCI interrupt from the non-PCI device directly to a central processing unit (CPU).

19. The system of claim 16, further comprising transmitting an IRQ as the PCI interrupt from the non-PCI device to cause parking of a hard disk drive (HDD) in response to detecting a freefall event.

20. The system of claim 16, further comprising transmitting an IRQ from a non-PCI accelerometer to cause parking of a hard disk drive (HDD) in response to detecting a freefall event.

* * * * *

UNITED STATES PATENT AND TRADEMARK OFFICE
CERTIFICATE OF CORRECTION

PATENT NO. : 7,644,222 B2
APPLICATION NO. : 11/586164
DATED : January 5, 2010
INVENTOR(S) : Jeffrey Kevin Jeansonne et al.

It is certified that error appears in the above-identified patent and that said Letters Patent is hereby corrected as shown below:

In column 3, line 58, in Claim 3, delete "gnerating" and insert -- generating --, therefor.

In column 4, line 5, in Claim 7, delete "$_{13}$ HID" and insert -- _HID --, therefor.

In column 4, line 8, in Claim 8, delete "comprising" and insert -- comprising: --, therefor.

In column 4, line 19, in Claim 10, delete "IRO" and insert -- IRQ --, therefor.

In column 4, line 29, in Claim 12, delete "IRO" and insert -- IRQ --, therefor.

In column 4, line 34, in Claim 14, delete "($_{13}$ HID)." and insert -- (_HID). --, therefor.

In column 4, line 51, in Claim 17, delete "($_{13}$ HID)" and insert -- (_HID) --, therefor.

Signed and Sealed this

Twenty-seventh Day of April, 2010

David J. Kappos
*Director of the United States Patent and Trademark Office*